United States Patent
Kurosawa

(10) Patent No.: US 8,208,032 B2
(45) Date of Patent: Jun. 26, 2012

(54) IMAGE SHAKE CORRECTION APPARATUS, AND CAMERA HAVING IMAGE SHAKE CORRECTION APPARATUS

(75) Inventor: Yuichi Kurosawa, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 337 days.

(21) Appl. No.: 12/504,000

(22) Filed: Jul. 16, 2009

(65) Prior Publication Data
US 2010/0020184 A1    Jan. 28, 2010

(30) Foreign Application Priority Data
Jul. 22, 2008    (JP) ................................. 2008-188133

(51) Int. Cl.
    *H04N 5/228*    (2006.01)
    *G03B 17/00*    (2006.01)
(52) U.S. Cl. ............. 348/208.99; 348/208.5; 348/208.4; 348/208.13; 396/55
(58) Field of Classification Search ............. 348/208.11, 348/208.99, 208.2, 208.4, 208.5, 208.7, 208.13, 348/139, 208.1; 396/52–55
See application file for complete search history.

(56) References Cited

U.S. PATENT DOCUMENTS

| | | | | |
|---|---|---|---|---|
| 5,719,451 | A * | 2/1998 | Cook et al. ................. | 310/12.27 |
| 8,013,897 | B2 * | 9/2011 | Nakayamai ................. | 348/208.7 |
| 2006/0055787 | A1 * | 3/2006 | Hirota et al. ................ | 348/208.5 |
| 2006/0279638 | A1 * | 12/2006 | Matsuda et al. ........... | 348/208.7 |
| 2008/0151063 | A1 | 6/2008 | Mogamiya | |
| 2008/0225126 | A1 | 9/2008 | Mogamiya | |
| 2008/0226276 | A1 | 9/2008 | Uenaka | |
| 2008/0226277 | A1 | 9/2008 | Uenaka et al. | |
| 2008/0298790 | A1 | 12/2008 | Uenaka et al. | |
| 2010/0097017 | A1 * | 4/2010 | Oteman et al. ............. | 318/376 |

FOREIGN PATENT DOCUMENTS

| | | |
|---|---|---|
| JP | 2005-184122 | 7/2005 |
| JP | 2006-208702 | 8/2006 |

OTHER PUBLICATIONS

English language Abstract of JP 2006-208702, Aug. 10, 2006.
English language Abstract of JP 2005-184122, Jul. 7, 2005.
U.S. Appl. No. 12/365,263 to Kurosawa, filed Feb. 4, 2009.
U.S. Appl. No. 12/365,332 to Kurosawa, filed Feb. 4, 2009.

* cited by examiner

*Primary Examiner* — Lin Ye
*Assistant Examiner* — Marly Camargo
(74) *Attorney, Agent, or Firm* — Greenblum & Bernstein, P.L.C.

(57) ABSTRACT

An image shake correction apparatus of a camera in which an object image is formed on an image sensor that is driven to move in first and second directions, which are orthogonal to each other, in a plane orthogonal to an optical axis to compensate for camera shake. The image shake correction apparatus includes a first table provided in a camera body to be movable in the first direction, and a second table which supports the image sensor and is movable in the second direction on the first table. At least one of the first table and the second table is supported by one guide bar and supported by a linear actuator which moves the one of the first table and the second table along the one guide bar, the one guide bar extending in a corresponding one of the first direction and the second direction.

11 Claims, 7 Drawing Sheets

IMAGE SHAKE CORRECTION APPARATUS, AND CAMERA HAVING IMAGE SHAKE CORRECTION APPARATUS

BACKGROUND OF THE INVENTION

1. Field of the Invention

The present invention relates to a camera for taking images such as moving images and still images, and in particular to an image shake correction apparatus incorporated in a camera which operates to compensate for handheld camera shake that occurs in the vertical and horizontal directions of the camera at a time of exposure.

2. Description of the Related Art

An image shake correction apparatus which compensates for handheld camera shake by finely moving an image sensor (image pickup device) in a plane orthogonal to the optical axis in the horizontal direction (X-direction) and the vertical direction (Y-direction) of the camera has been proposed for a camera, e.g., for a digital camera that takes still images using an image sensor. Although various configurations for making an image sensor move in the X and Y directions in such a manner have been proposed, and among these configurations the employment of a so-called "X-Y stage" is effective for simplifying the image shake correction apparatus. An X-Y stage includes a Y-table movable in the Y-direction relative to a stationary base plate and an X-table movable in the X-direction relative to the Y-table, and an image sensor is mounted on the X-table, which makes it possible to move (reciprocate) the image sensor in the X and Y directions relative to the stationary base plate. For instance, this type of image shake correction apparatus is disclosed in Japanese Unexamined Patent Publication 2006-208702, specifically in the embodiment shown in FIG. 9 thereof, in which a Y-direction moving plate is supported to be movable in the Y-direction by a pair of Y-direction guide bars fixed to a stationary support base plate, and the Y-direction moving plate is driven to move in the Y-direction by a Y-direction drive system including a coil and a magnet. In addition, an X-direction moving plate that holds a CCD is supported to be movable in the X-direction by a pair of X-direction guide bars fixed to the Y-direction moving plate, and the X-direction moving plate is driven to move in the X-direction by an X-direction drive system including a coil and a magnet. Additionally, the magnitude of camera shake which occurs in the camera is detected by a sensor provided in the camera, and the Y-direction moving plate and the X-direction moving plate are moved (driven) by controlling the operations of the X-direction drive system and the Y-direction drive system, respectively, in such a manner as to compensate for the detected magnitude of camera shake. Such movements of the Y-direction moving plate and the X-direction moving plate move the CCD in the X and Y directions to thereby correct image shake caused by hand shake so as to maintain the object image at a constant position on the imaging surface of the image sensor.

In the image shake correction apparatus disclosed in Japanese Unexamined Patent Publication 2006-208702, it is necessary to provide the image shake correction apparatus with a pair of Y-direction guide bars and a Y-direction drive system to move the Y-direction moving plate in the Y-direction in a plane orthogonal to an optical axis of the photographing optical system, and it is also necessary to provide the image shake correction apparatus with a pair of X-direction guide bars and an X-direction drive system to move the X-direction moving plate in the X-direction. Therefore, the number of elements of the image shake correction apparatus is great, which complicates the structure thereof and makes it difficult to miniaturize the image shake correction apparatus. In particular, the pair of Y-direction guide bars are disposed so as to extend along both sides of the Y-direction moving plate, respectively, while the pair of X-direction guide bars are disposed so as to extend along both sides of the X-direction moving plate, respectively, and installation space for these pairs of guide bars must be secured. In addition, installation space must be provided for the Y-direction drive system and the X-direction drive system; however, these spaces make it difficult to miniaturize the image shake correction apparatus.

SUMMARY OF THE INVENTION

The present invention provides a simple and compact image shake correction apparatus consisting of a reduced number of components.

According to an aspect of the present invention, an image shake correction apparatus of a camera is provided, in which an object image is formed on an image sensor via a photographing lens and in which the image sensor is driven to move in a first direction and move in a second direction orthogonal to the first direction in a plane orthogonal to an optical axis of the photographing lens in such a manner as to compensate for camera shake occurring at a time of exposure. The image shake correction apparatus includes a first table which is movable in the first direction relative to a camera body of the camera, and a second table which supports the image sensor and is movable in the second direction on the first table. At least one of the first table and the second table is supported by one guide bar and one linear actuator, the one guide bar extending in one of the first direction and the second direction; and the one linear actuator extends in a direction parallel with the one guide bar and moves the one of the first table and the second table along the one guide bar.

It is desirable for the first table to be supported by a first guide bar which extends in the first direction and a first linear actuator which moves the first table in the first direction, and the second table is supported by a second guide bar which extends in the second direction and a second linear actuator which moves the second table in the second direction.

It is desirable for each of the first linear actuator and the second linear actuator to include a rod-shaped magnet and a coil provided around the rod-shaped magnet. One and the other of the rod-shaped magnet and the coil serve as a stator and a mover. The stator is connected to one of the camera body and the first table. The mover is connected to one of the first table and the second table.

It is desirable for the rod-shaped magnet to form magnetic fields in radial directions and include one of joined magnets and a multi-polar magnet, wherein the joined magnets are composed of at least two magnets joined to each other at one of north poles and south poles thereof, and the multi-polar magnet is structured so that a plurality of magnetic poles are alternately arranged in an axial direction of the stator. The coil includes at least one bearing portion which is in contact with an outer periphery of the rod-shaped magnet to be slidable thereon in the axial direction.

It is desirable for the image shake correction apparatus to include a vibration sensor which senses vibrations of the camera, and an electric-current controller which controls a current passed through the coil in accordance with a detection signal output from the variation sensor. The electric-current controller passes the current through the coil in order to compensate for the vibrations that are sensed by the vibration sensor.

It is desirable for the mover to include a coil housing having two bearing portions at opposite ends of the coil housing in an axial direction thereof, respectively, the two bearing portions being in contact with an outer peripheral surface of the rod-shaped magnet. Alternatively, it is desirable for the coil to include two bearing portions at opposite ends of the coil in an axial direction thereof, respectively, the two bearing portions being in contact with an outer peripheral surface of the rod-shaped magnet. With the formation of such bearing portions, the mover can move relative to the stator in the axis direction thereof with stability even in the case where the coil moves relative to the rod-shaped magnet in the axial direction thereof.

In addition, it is desirable for the rod-shaped magnet to be formed from a plurality of magnets joined to each other in an axial direction of the rod-shaped magnet. Alternatively, the rod-shaped magnet can be made of an isotropic magnetic material which is magnetized to form N-poles and the S-poles arranged alternately in an axial direction of the rod-shaped magnet.

It is desirable for the first table to include an X-table which is driven to move in a horizontal direction of the camera, and for the second table to include a Y-table which is driven to move in a vertical direction of the camera relative to the X-table.

It is desirable for the stator and the mover to be fixed to and supported by the camera body and the X-table, respectively, in the X-direction linear actuator. The stator and the mover are fixed to and supported by the X-table and the Y-table, respectively, in the Y-direction linear actuator.

In an embodiment, a camera having an image shake correction apparatus is provided, including an image sensor on which an object image is formed via a photographing lens, the image sensor being driven to move in two orthogonal directions in a plane orthogonal to an optical axis of the photographing lens in such a manner as to compensate for camera shake which occurs at a time of exposure; a first table movable in one of the two orthogonal directions relative to the camera; and a second table mounted on the first table to be movable in the other of the two orthogonal directions relative to the first table, the image sensor being mounted on the second table. At least one of the first table and the second table is guided in a moving direction thereof by a guide bar and by a linear actuator which are positioned at opposite ends of the one of the first table and the second table, the linear actuator driving the one of the first table and the second table so as to move along the guide bar.

According to the present invention, in each of the first and second linear actuators, in the case where an imaging unit is configured so that the first table and the second table can move in the first direction and the second direction, respectively, one of the two guides disposed on both sides of each table can be composed of a linear actuator serving as a power source for the table, so that an independent guide does not have to be disposed on the linear actuator side. With this structure, only a single guide bar needs to be provided for at least one of the first table and the second table, which makes it possible to simplify the image shake correction apparatus and also to achieve miniaturization thereof.

The present disclosure relates to subject matter contained in Japanese Patent Application No. 2008-188133 (filed on Jul. 22, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

According to the present invention, it is desirable that the coil be configured in the following manner. The coil is configured to include a coil housing which has two bearing portions at the opposite ends thereof in the axial direction of the coil housing, respectively, wherein the two bearing portions are in contact with an outer peripheral surface of the rod-shaped magnet. Alternatively, independently of a coil housing of the coil which houses the coil and can move in the axial direction of the rod-shaped magnet, the coil is configured to include two bearing portions at the opposite ends of the coil in the axial direction thereof, respectively, wherein the two bearing portions are in contact with an outer peripheral surface of the rod-shaped magnet. Accordingly, the mover is supported by the bearing portion and moves (reciprocates) relative to the stator while being guided in the axial direction by the stator, the mover moves along the axis of the stator with stability when the mover moves relative to the stator in the axial direction because of the formation of the bearing portion. In addition, it is desirable that the rod-shaped magnet be formed from a plurality of magnets joined to each other in an axial direction of the rod-shaped magnet or an isotropic magnetic material which is magnetized to form south and north poles arranged alternately in the axial direction of the rod-shaped magnet.

As an embodiment of the present invention, the first table is formed as an X-table which is driven to move in the lateral direction of the camera, and the second table is formed as a Y-table which is driven to move in the vertical direction of the camera relative to the X-table. Additionally, the X-direction linear actuator is configured so that the stator and the mover are fixed to and supported by the camera body and the X-table, respectively, and the Y-direction linear actuator is configured so that the stator and the mover are fixed to and supported by the X-table and the Y-table, respectively.

Figure 1:
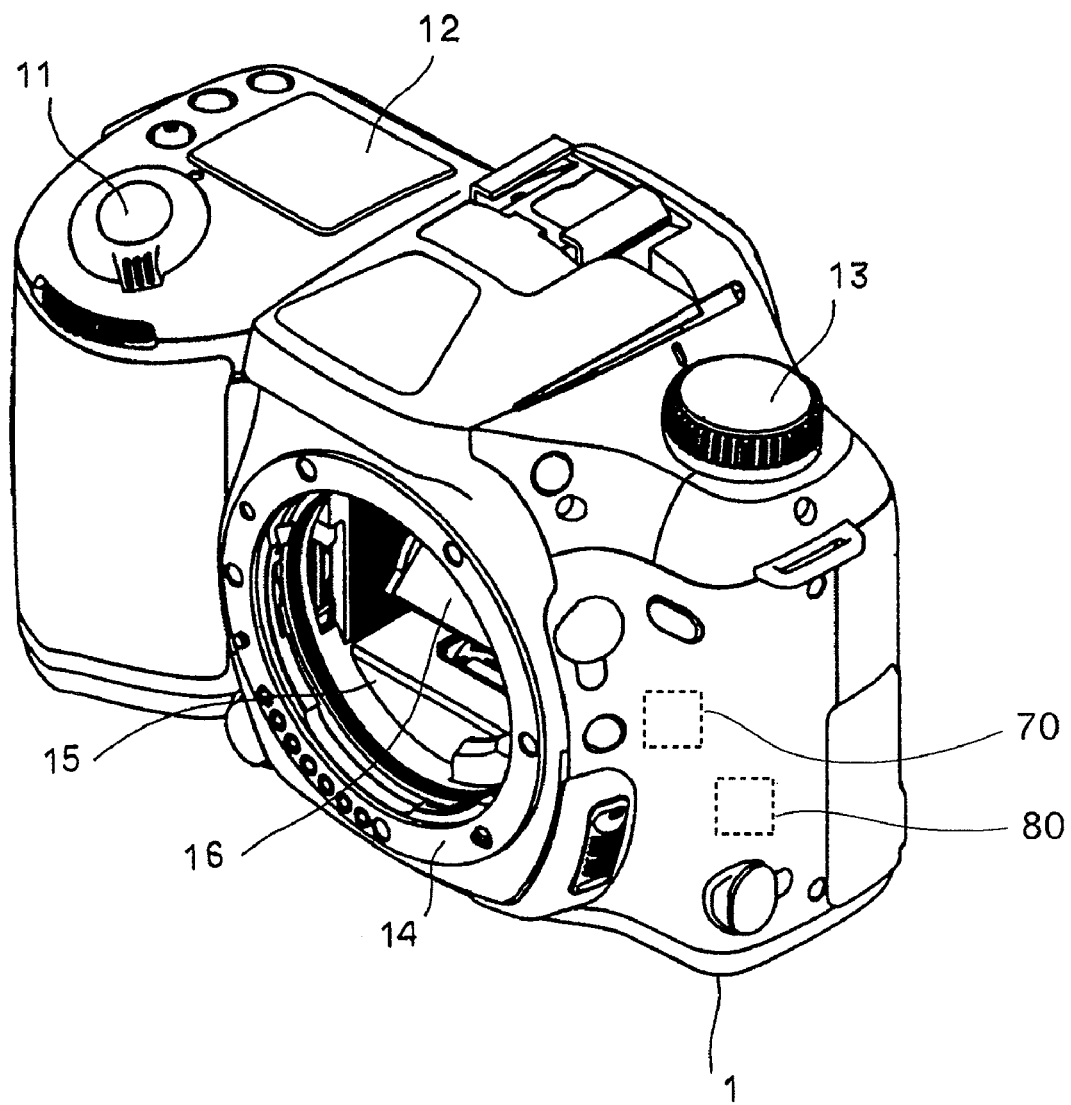
FIG. 1 is a perspective view of a camera body equipped with an image shake correction apparatus according to the present invention.

FIG. 1 is an external perspective view of a camera body 1 of an SLR digital camera equipped with a first embodiment of an image shake correction apparatus according to the present invention. The camera body 1 is provided with a release button 11, an LCD indicator 12, a mode select dial 13 and others. In addition, the camera body 1 is provided on the front thereof with a lens mount 14 to which an interchangeable lens (not shown) is mountable. The camera body 1 is provided therein behind the lens mount 14 with a mirror box 15, and is further provided in the mirror box 15 with a main mirror 16 which swings upward at a time of exposure. The camera body 1 is provided behind the mirror box 15 with a shutter unit 2 (see FIG. 2), and an image shake correction apparatus 4 which is provided therein with an imaging unit 3 (see FIGS. 2 and 3). The camera body 1 is provided therein with a vibration sensor 70 (see FIG. 1) for detecting vibrations of the camera body 1 when, e.g., a picture is taken by operating the release button 11. In accordance with the detection signal output from the vibration sensor 70, each of an X-table 41 and a Y-table 42 of the image shake correction apparatus 4 is driven to finely move to compensate for image shake (handheld camera shake) at the imaging unit 3 at a time of exposure.

Figure 2:
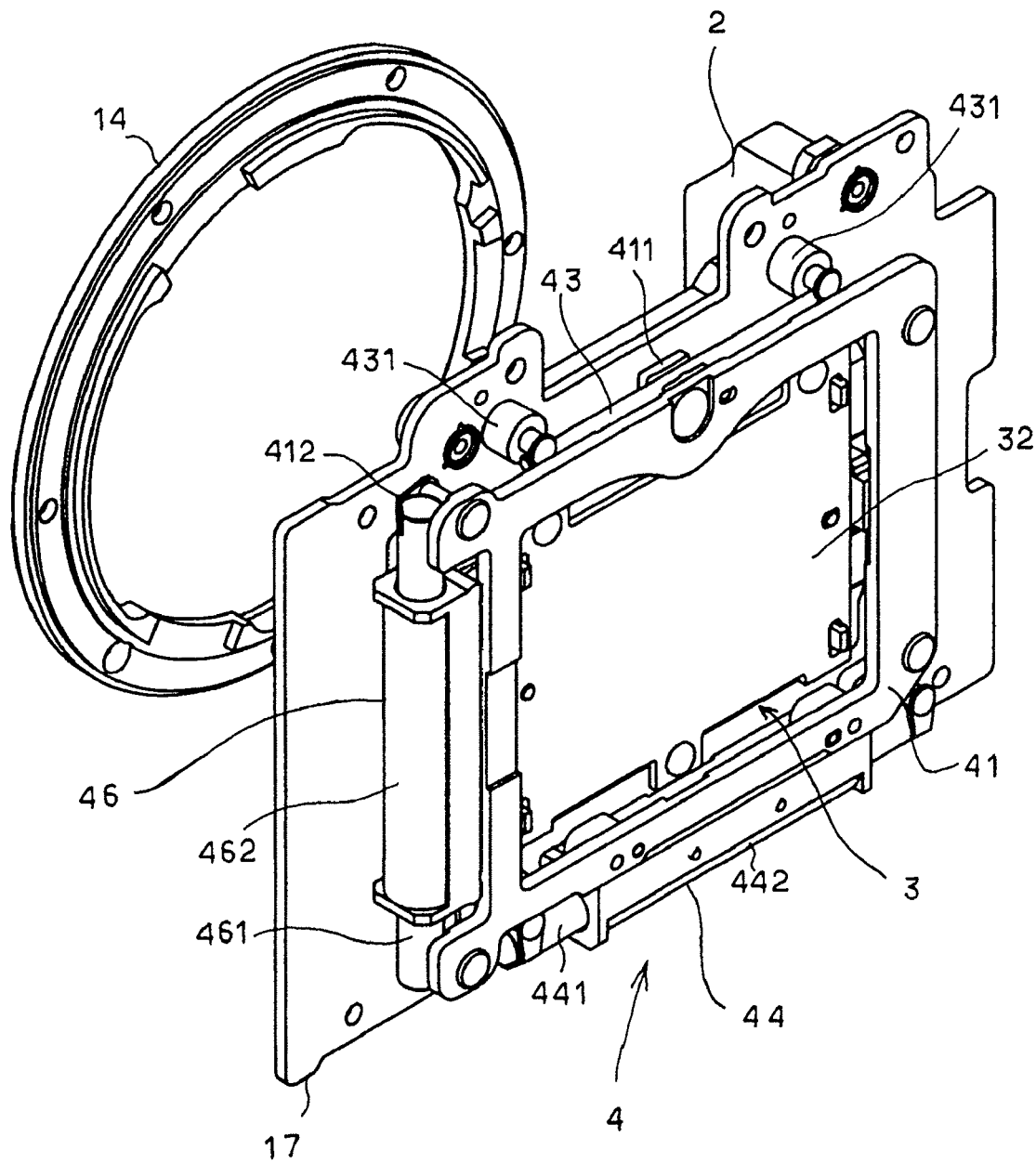
FIG. 2 is a rear perspective view of the image shake correction apparatus, and a lens mount of the camera body, to which an interchangeable lens is detachably mounted.

FIG. 2 is a perspective view of the mount 14, the shutter unit 2 that is disposed behind the mirror box 15, and the image shake correction apparatus 4 that is disposed behind the shutter unit 2 and the imaging unit 3 disposed within the image shake correction apparatus, as viewed from behind the camera body 1. In regard to the orientation of the image shake correction apparatus 4, the 'left', 'right', 'front' and 'rear' sides are determined as shown in FIG. 2, and are determined with respect to the user of the camera.

Figure 3:
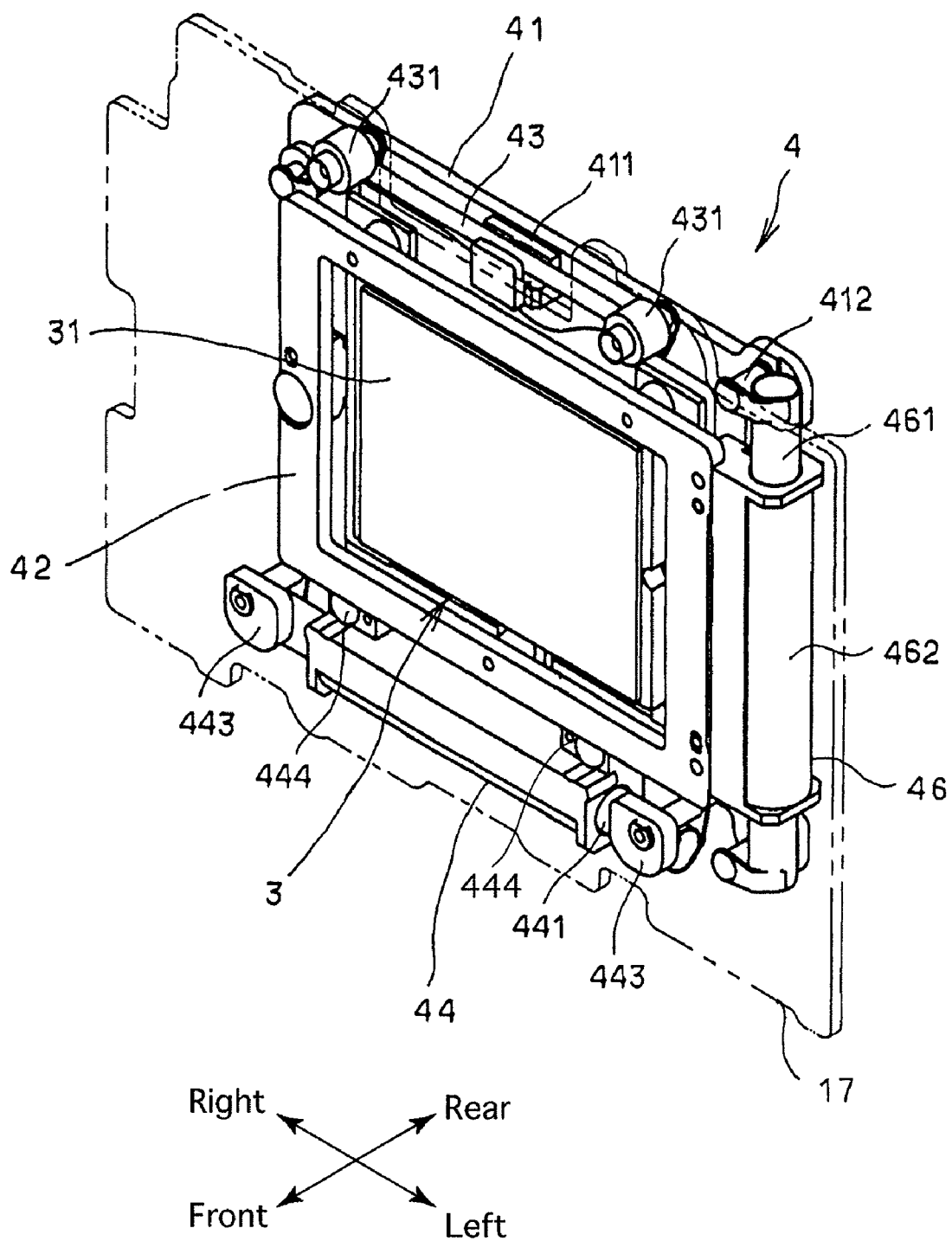
FIG. 3 is a front perspective view of the image shake correction apparatus.
Figure 4:
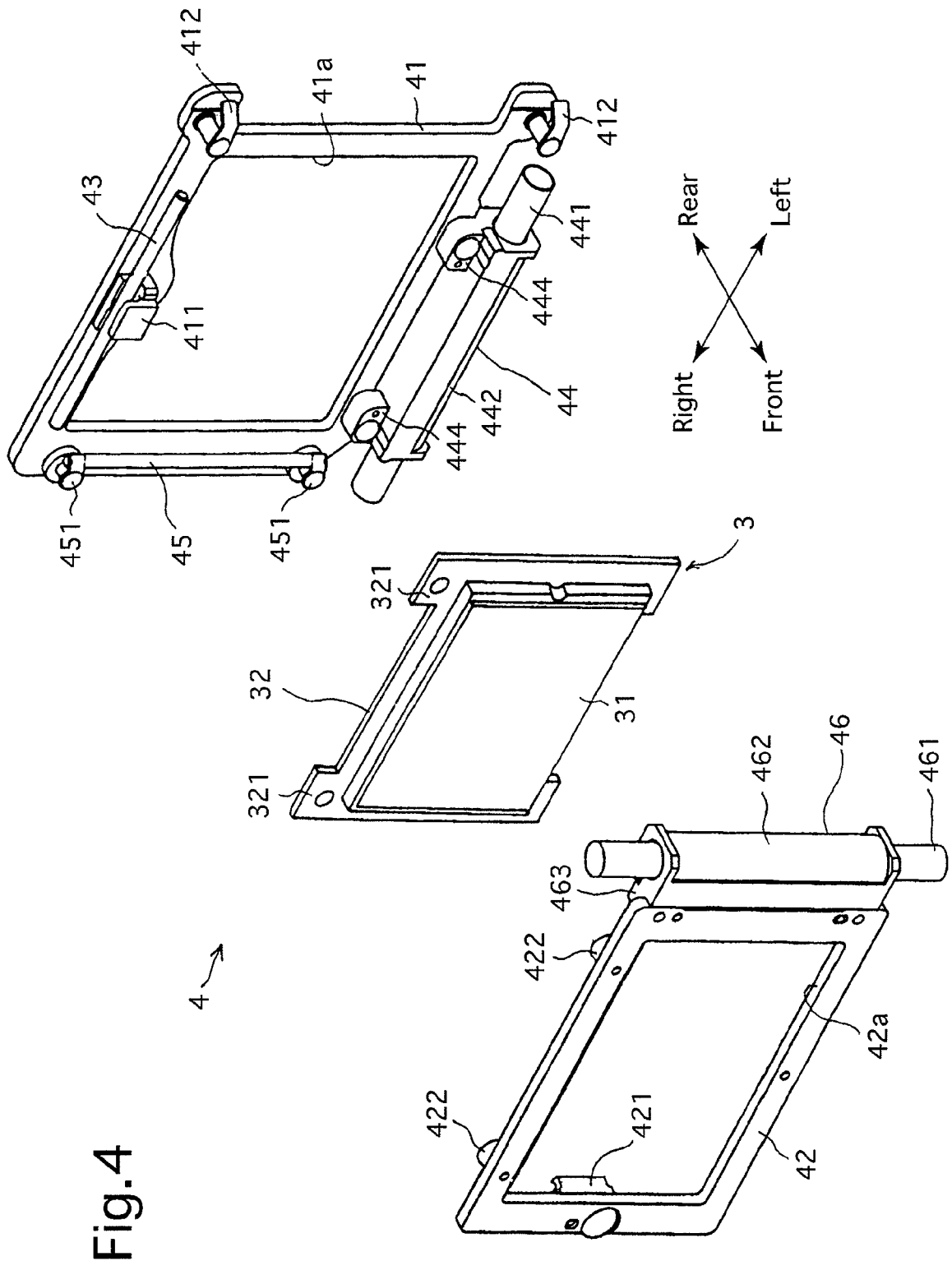
FIG. 4 is an exploded rear perspective view of main components of the image shake correction apparatus.

The camera body 1 is provided therein with a planar body chassis (camera body) 17 which stands in the vertical direction of the camera body 1 so as to face the lens mount 14. The shutter unit 2 is fixed to the front of the body chassis 17, while image shake correction apparatus 4 (imaging unit 3) is provided on the back of the body chassis 17. FIG. 3 is a front perspective view of the image shake correction apparatus 4, and FIG. 4 is an exploded perspective view of main components of the image shake correction apparatus 4 which includes the imaging unit 3. As shown in FIGS. 2 through 4, the image shake correction apparatus 4 is provided, at a position facing a rectangular opening (not shown) formed in the body chassis 17, with the X-table 41 and the Y-table 42. The X-table 41 is capable of finely moving in the X-direction (horizontal/lateral direction) relative to the body chassis 17 and the Y-table 42 is capable of finely moving in the Y-direction (vertical direction) relative to the X-table 41. The imaging unit 3 is mounted to the Y-table 42. The imaging unit 3 is provided with a substrate 32 which supports an image sensor 31, and the Y-table supports the substrate 32.

As shown in FIG. 4, the X-table 41 is in the form of a rectangular planar frame having a rectangular opening 41a that has greater lengthwise and crosswise dimensions than the outer dimensions of the image sensor 31, and the Y-table 42 is in the form of a rectangular planar frame having a rectangular opening 42a that has substantially the same lengthwise and crosswise dimensions as the outer dimensions of the image sensor 31. The image shake correction apparatus 4 is provided on the back of the body chassis 17 with an X-guide bar (guide rod) 43 which extends in the X-direction along the upper edge of the X-table 41. The X-guide bar 43 has a circular cross-sectional shape and can either be a solid bar (rod) or be in the form of a tube. The opposite ends of the X-guide bar 43 are fixed to and supported by the body chassis 17 via two support members 431 (shown in FIG. 3), respectively. In addition, the image shake correction apparatus 4 is provided, on the back of the body chassis 17 along the lower edge of the X-table 41, with an X-direction linear actuator 44 having a stator 441 and a mover 442 which is fitted on the stator 441 and capable of reciprocating in the X-direction relative to the stator 441. The stator 441 is in the shape of a cylindrical rod, and the opposite ends of the stator 441 are fixed to and supported by the body chassis 17 via two support members 443 (shown in FIG. 3), respectively. Hence, the X-direction linear actuator 44 and the X-guide bar 43 both extend in the X-direction, parallel to each other. The details of the X-direction linear actuator 44 will be discussed later.

An X-guide 411, in the shape of a U-bracket which is open upwards, is fixed to the front of the X-table 41 on the upper edge thereof. The X-guide 411 is slidably engaged with the X-guide bar 43 to be guided in the X-direction thereby. Additionally, the mover 442 of the X-direction linear actuator 44 is fixed to the lower edge of the X-table 41 via two support lugs 444 formed integral with the lower edge of the X-table 41. The mover 442 moves (reciprocates) in the axial direction of the stator 441. Since the mover 442 is fixed to the X-table 41, reciprocal movements of the mover 442 along the stator 441 in the X-direction cause the X-table 41 to move integrally with the mover 442 in the X-direction while the X-guide 441 is being guided by the X-guide bar 43 in the vicinity of the upper edge of the X-table 41.

The image shake correction apparatus 4 is provided, on the front of the X-table 41 along the right edge of the rectangular opening 41a, with a Y-guide bar (guide rod) 45 which extends in the Y-direction, and the opposite ends of the Y-guide bar 45 are fixed to and supported by the X-table 41 via two support members 451, respectively. The Y-guide bar 45 has a circular cross-sectional shape and can either be a solid bar (rod) or be in the form of a tube. In addition, the image shake correction apparatus 4 is provided, on the front of the X-table 41 along the left edge of the rectangular opening 41a with a Y-direction linear actuator 46 having a stator 461 and a mover 462 which is fitted on the stator 461 and capable of reciprocating in the Y-direction relative to the stator 461. The stator 461 is in the shape of a cylindrical rod, and the opposite ends (upper and lower ends) of the stator 461 are fixed to and supported by the X-table 41 via two support members 412, respectively. The two support members 412 are each in the form of a leaf spring, and the opposite ends of the stator 461 are held between the two support members 412 and adjacent front surfaces of the X-table 41 by the biasing forces of the two support members 412, respectively. Hence, the Y-direction linear actuator 46 and the Y-guide bar 45 both extend in the Y-direction, parallel to each other.

Figure 5:
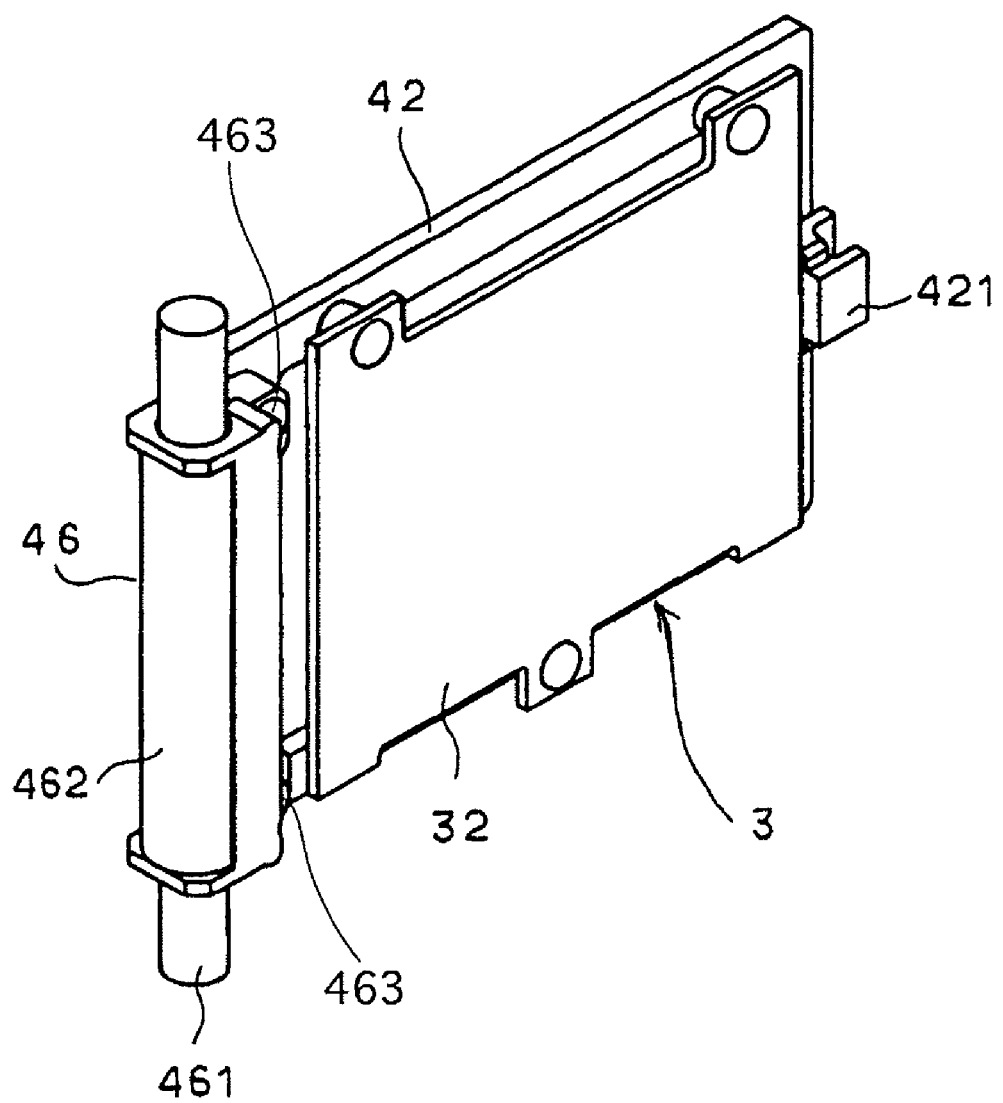
FIG. 5 is a rear perspective view of the Y-table shown in FIGS. 3 and 4 and associated elements.

FIG. 5 shows a rear perspective view of the Y-table 42 in a state where the imaging unit 3 is mounted to the Y-table 42. A Y-guide 421 in the shape of a U-bracket which is open rightward is fixed to the rear of the Y-table 42 on the right edge thereof as viewed from the rear. The Y-guide 421 is slidably engaged with the Y-guide bar 45 to be guided in the Y-direction by the Y-guide bar 45. Additionally, the mover 462 of the Y-direction linear actuator 46 is fixed to the left edge of the Y-table 42 via two support lugs 463 formed integral with the left edge of the Y-table 42. The mover 462 moves (reciprocates) in the axial direction of the stator 461. Since the mover 462 is fixed to the Y-table 42, reciprocal movements of the mover 462 along the stator 461 in the Y-direction cause the Y-table 42 to move integrally with the mover 462 in the Y-direction while the Y-guide 421 is being guided by the Y-guide bar 45.

In addition, the image shake correction apparatus 4 is provided, on the back of the Y-table 42 in the vicinity of the four corners of the rectangular opening 42a of the Y-table 412, with four substrate support members 422, respectively, and the substrate 32 is fixed to and supported by the Y-table 42 via the four substrate support members 422 at four corner portions 321 of the substrate 32, respectively. With this structure, the imaging surface of the image sensor 31 is exposed toward the front of the camera through the rectangular opening 42a of the Y-table 42.

Figure 6A:
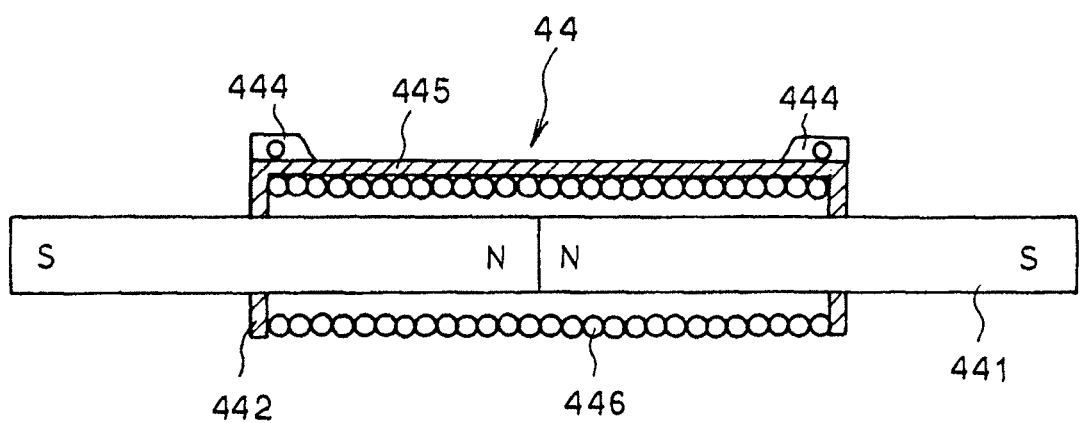
FIG. 6A is a schematic cross sectional view of the X-direction linear actuator shown in FIGS. 2 through 4.
Figure 6B:
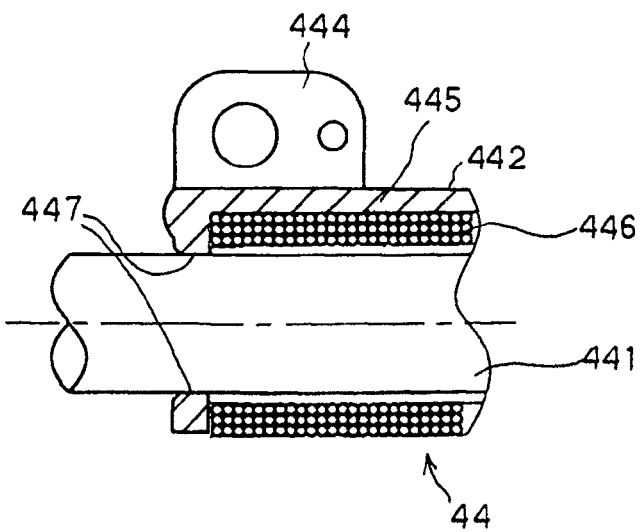
FIG. 6B is a cross sectional view of part of the X-direction linear actuator.

The X-direction linear actuator 44 and the Y-direction linear actuator 46 are mutually identical in structure, and hence, only a detailed explanation of the structure of the X-direction linear actuator 44 will be herein given. FIG. 6A is a cross sectional view of the X-direction linear actuator 44. The stator 441 of the X-direction linear actuator 44 is in the form of an integral including two columnar-rod-shaped magnets having a predetermined length, each of which has an S-pole and a N-pole at the opposite ends, respectively. These two magnets are integrally fixed to each other with the north poles of the two magnets joined to each other by an adhesive or the like. With this integrated magnet, a magnetic field in radial directions is created at each magnetic pole of the stator 441. In addition, the mover 442 includes a coil housing 445 and a single-phase coil 446. The coil housing 445 is in the form of a cylinder which is greater in diameter than that of the stator 441, and is movable in the axial direction relative to the stator 441. The single-phase coil 446 is wound so as to be fitted on the inner peripheral surface of the coil housing 445. A current is passed through the single-phase coil 446. The support lugs 444 that are fixed to the X-table 41 are formed at the opposite ends of the coil housing 445, respectively. In addition, to make the coil housing 445 capable of moving in the axial direction relative to the stator 441 with stability, the coil housing 445 is provided, at the opposite ends thereof on the inner peripheral surface of the coil housing 445, with two bearing portions 447, respectively, which are in sliding contact with the outer peripheral surface of the stator 441 as shown in FIG. 6B that shows an enlarged view of part of the X-direction linear actuator 44.

According to the structure of the X-direction linear actuator 44, passing a current through the single-phase coil 446 causes the single-phase coil 446 to produce a driving force in the axial direction according to Fleming's left hand rule by the interaction between the magnetic fields generated by the magnets of the stator 441 and the current passed through the single-phase coil 446. Thereupon, by controlling the direction and the magnitude of the current passed through the single-phase coil 446, the single-phase coil 446 can be made to produce a driving force in one direction and a driving force in the other direction alternately along the axial direction (the X-direction). Therefore, the mover 442 can be driven to move (reciprocate) by a required stroke at a required speed in the axial direction of the stator 441. The Y-direction linear actuator 46 operates in the same manner as the X-direction linear actuator 44 except for the moving (reciprocating) directions of the mover 462, so that the details on the operation of the Y-direction linear actuator 46 are omitted from the following descriptions.

In the X-direction linear actuator 44, the horizontally opposite ends of the stator 441 are fixed to and supported by the body chassis 17, and the mover 442 is fixed to the X-table 41. In the Y-direction linear actuator 46, the vertically opposite ends of the stator 461 are fixed to and supported by the X-table 41, and the mover 462 is fixed to the Y-table 42. In addition, the coils of the movers 442 and 462 of the X-direction linear actuator 44 and the Y-direction linear actuator 46 are electrically connected to an image shake correcting controller 80 which is electrically connected to a vibration sensor 70 provided in the camera body 1. In accordance with a detection signal output from the vibration sensor 70 upon detecting image shake caused by hand shake, etc., the image shake correcting controller 80 passes a correction current (which is controlled to compensate for the image shake detected by the vibration sensor 70) through each of the coils of the movers 442 and 462 in order to carry out shake correction.

When power of the camera is ON, predetermined specified currents are respectively passed through the coils of the movers 442 and 462 of the X-direction linear actuator 44 and the Y-direction linear actuator 46. Upon the passage of the specified currents through the coils (the movers 442 and 462), the single-phase coils (the movers 442 and 462) are moved to predetermined axial positions thereof relative to the stators 441 and 461 and held thereat, respectively. When the single-phase coils (the movers 442 and 462) are positioned in the predetermined axial positions thereof, the center of the imaging surface of the image sensor 31 is substantially coincident with the photographing optical axis of the interchangeable lens mounted to the lens mount 14, and when the camera is not in image-shake correcting mode (image-shake reduction mode) an image capturing operation (photographing operation) is performed with the center of the image sensor 31 being substantially coincident with the photographing optical axis of the interchangeable lens mounted to the lens mount 14. On the other hand, when the camera is in image-shake correcting mode (image-shake reduction mode), if the object image vibrates in the X and Y directions relative to the imaging surface of the image sensor 31 due to camera shake upon the release button 11 being depressed, i.e., if image shake occurs upon the release button 11 being depressed, the vibrations are detected by the vibration sensor 70, and a detection signal output from the vibration sensor 70 is input to the image shake correcting controller 80. Thereupon, the image shake correcting controller 80 passes correction currents, for compensating the detected image shake, through the coils of the movers 442 and 462 of the X-direction linear actuator 44 and the Y-direction linear actuator 46. For instance, in the X-direction linear actuator 44, upon a correction current being passed through the single-phase coil 446 of the mover 442, the mover 442, to which the single-phase coil 446 is fixed, is driven to move in the axial direction of the stator 441 by the driving force generated by the single-phase coil 446 thereat. This causes the X-table 41, to which the mover 442 is fixed, to move in the X-direction relative to the body chassis 17. During this motion of the X-table 41, the X-guide 411 that is fixed to the X-table 41 is guided and supported by the X-guide bar 43 at the upper edge of the X-table 41 while the coil housing 445 of the mover 442 that is fixed to the X-table 41 is guided and supported by the stator 441 at the lower edge of the X-table 41, and accordingly, the X-table 41 is guided and supported at both upper and lower ends thereof, thus being driven to move in the X-direction with stability.

Similarly, in the Y-direction linear actuator 46 also, a correction current is passed through the coil of the mover 462, and thereby the mover 462 is driven to move in the axial direction of the stator 461, so that the Y-table 42, to which the mover 462 is fixed, is driven to move in the Y-direction relative to the X-table 41. During this motion of the Y-table 42, the Y-guide 421 that is fixed to the Y-table 42 is guided and supported by the Y-guide bar 45 at the right edge of the Y-table 42 while the mover 462 that is fixed to the Y-table 42 is guided and supported by the stator 461 at the left edge of the Y-table 42, and accordingly, the Y-table 42 is guided and supported at both left and right ends thereof, thus being driven to move in the Y-direction with stability. Therefore, the (reciprocating) motion of the X-table 41 in the X-direction and the (reciprocating) motion of the Y-table 42 in the Y-direction cause the image sensor 31, which is supported by the Y-table 42, to be driven to move (reciprocate) in the X and Y directions. This compensates for camera shake caused by hand shake to cancel out movements of the object image formed on the imaging surface of the image sensor 31 to thereby correct image shake.

In this manner, in the above described embodiment of the image shake correction apparatus, the X-direction linear actuator 44 and the Y-direction linear actuator 46 are configured such that each of the movers 442 and 462 has two bearing portions (the two bearing portions 447 in the case of the X-direction linear actuator 44) capable of reciprocating in the axial direction with respect to the associated stator 441 or 461. Accordingly, when the movers 442 and 462 move relative to the stators 441 and 461 in the axial directions thereof, the movers 442 and 462 move along the axes of the stators 441 and 461 with stability, respectively. Therefore, since the lower edge of the X-table 41 that moves (reciprocates) in the X-direction relative to the body chassis 17 is guided and supported by the X-direction linear actuator 44, each of the upper and lower edges of the X-table 41 can move (reciprocate) in the X-direction while being supported with stability relative to the body chassis 17 with no need to install an X-guide bar similar to the X-guide bar 43 to the lower edge of the X-table 41, which makes it possible to simplify the support structure for the X-table 41. In addition, since the left edge of the Y-table 42, that moves (reciprocates) in the Y-direction relative to the X-table 41, is guided and supported by the Y-direction linear actuator 46, each of the left and right edges of the Y-table 42 can move (reciprocate) in the Y-direction while being supported with stability relative to the X-table 41 with no need to install a Y-guide bar similar to the Y-guide bar 45 on the left edge of the Y-table 42, which makes it possible to simplify the support structure for the Y-table 42.

Figure 7A:
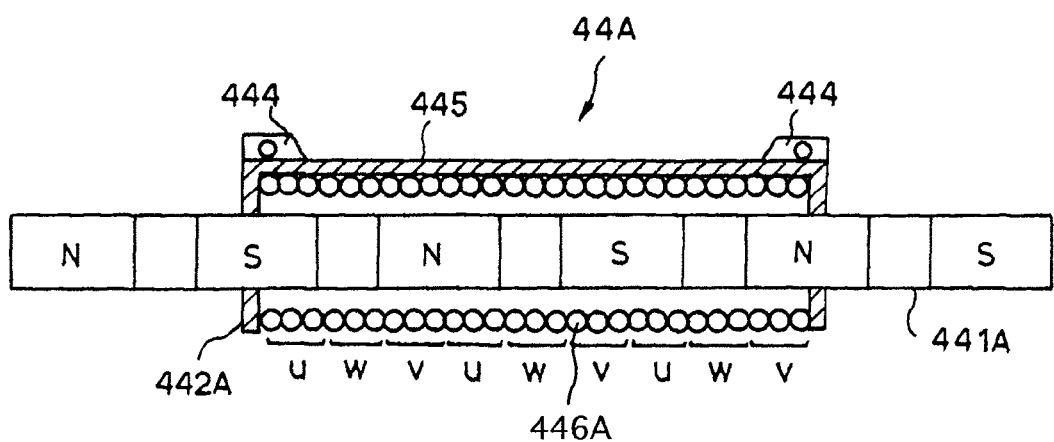
FIG. 7A is a view corresponding to that of FIG. 6A, showing a modified embodiment of the X-direction linear actuator.

In each of the X-direction linear actuator 44 and the Y-direction linear actuator 46, it is possible for the stator to be in the form of a multi-polar magnet and for the mover to be in the form of a three-phase coil. FIG. 7A shows a modified embodiment of the X-direction linear actuator. This modified embodiment of the X-direction linear actuator 44A is provided with a stator 441A and a mover 442A. The stator 441A is in the form of a multi-polar magnet in the shape of a cylindrical rod having a predetermined length. This multi-polar magnet is structured so that the N-poles and the S-poles are alternately arranged in the axial direction of the stator 441A at predetermined intervals. For instance, the multi-polar magnet can be made of a plurality of short rod-shaped permanent magnets which are bonded together by an adhesive into a single rod extending in the axial direction so that same poles of adjacent permanent magnets of the plurality of permanent magnets are axially opposed, or the multi-polar magnet can be an isotropic magnetic material having a columnar rod shape which is magnetized to form N-poles and S-poles arranged alternately in the axial direction. Due to this structure, magnetic fields in centripetal and centrifugal radial directions are alternately formed in the axial direction by the N-poles and the S-poles of the stator 441A, respectively. In addition, the mover 442A includes a coil housing 445 and a three-phase coil 446A. The coil housing 445 is formed into a cylinder which is greater in diameter than the stator 441A, and is movable in the axial direction relative to the stator 441A. The three-phase coil 446A is wound so as to be fitted on the inner peripheral surface of the coil housing 445. The three-phase coil 446A is in the form of a plurality of coils through which currents are independently passed and which are arranged in the axial direction of the stator 441A to correspond to the intervals at which the N-poles and the S-poles of the stator 441 are arranged. In this particular embodiment, the three-phase coil 446A includes three sets of coils each set of which consists of three coils: a coil u, a coil w, and a coil v which are arranged in the axial direction of the stator 441A. In other words, the three-phase coil 446A consists of three coils u, three coils w and three coils v.

In the X-direction actuator 44A, by passing a current through each of the coils u, w and v, a driving force urging the three-phase coil 446A to move in the axial direction is created at the three-phase coil 446A according to Fleming's left hand rule due to the interaction between the magnetic fields created at the magnetic poles of the multi-polar magnet of the stator 441A and the currents passed through the three-phase coil 446A. Thereupon, by controlling the directions and timings of currents passed through the nine coils u, w and v, the three-phase coil 446A can be made to produce a driving force in one direction and a driving force in the other direction alternately along the axial direction (the X-direction). Therefore, by switching between these controls at high speed, the mover 442A, to which the three-phase coil 446A is fixed, can be driven to reciprocate through a required stroke at a required speed in the axial direction of the stator 441A. A Y-direction linear actuator which corresponds to the X-direction linear actuator 44A operates in the same manner as the X-direction linear actuator 44A except the reciprocating (moving) directions of the mover are in the Y-direction instead of the X-direction, and hence, the details on the operation of the Y-direction linear actuator are omitted from the following descriptions.

Figure 7B:
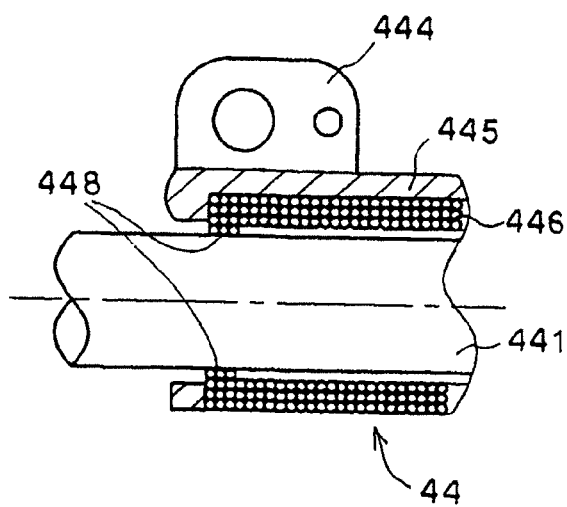
FIG. 7B is a view corresponding to that of FIG. 6B, showing part of another modified embodiment of the X-direction linear actuator.

Instead of forming bearing portions on part of the coil housing 445 as with the case of the first embodiment of the image shake correction apparatus 4, a bearing portion 448 formed from part of the single-phase coil 446 can be made to come in contact with the outer peripheral surface of the stator 441 at each axially opposite end of the X-direction linear actuator 44, as shown in FIG. 7B that shows part of another modified embodiment of the X-direction linear actuator 44.

Although the X-table 41 is supported by the body chassis 17 to be movable in the X-direction and the Y-table 42 is supported by the X-table 41 to be movable in the Y-direction in the first embodiment of the image shake correction apparatus, it is possible that the Y-table be supported by the body chassis to be movable in the Y-direction, that the X-table be supported by the Y-table to be movable in the X-direction and that the imaging unit be mounted to this X-table. In this case, the opposite ends of the stator of the Y-direction linear actuator are supported by the body chassis while the opposite ends of the stator of the X-direction linear actuator are supported by the Y-table.

It is possible that the present invention be applied only to one of the X-table and the Y-table. For example, the present invention can be applied only to the support structure for the X-table that is supported by the X-direction linear actuator, or alternatively, applied only to the support structure for the Y-table that is supported by the Y-direction linear actuator.

In each of the X-direction linear actuator and the Y-direction linear actuator in the first embodiment of the image shake correction apparatus 4, it is possible that a columnar-rod-shaped magnet or multi-polar magnet be made to serve as a mover while a coil (or coils) be made to serve as a stator. For instance, in the case of the X-table, the coil can be fixed to the body chassis, the X-table can be connected to the columnar-rod-shaped magnet or multi-polar magnet, and the X-direction linear actuator can be configured to allow the columnar-rod-shaped magnet or multi-polar magnet to move (reciprocate) in the X-direction relative to the coil. In addition, in the case of the Y-, the X-table can be fixed to the coil, the Y-table can be connected to the columnar-rod-shaped magnet or multi-polar magnet, and the Y-direction linear actuator can be configured to allow the columnar-rod-shaped magnet or multi-polar magnet to move (reciprocate) in the Y-direction relative to the coil.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image shake correction apparatus of a camera in which an object image is formed on an image sensor via a photographing lens and in which said image sensor is driven to move in a first direction and move in a second direction orthogonal to said first direction in a plane orthogonal to an optical axis of said photographing lens in such a manner as to compensate for camera shake occurring at a time of exposure, wherein said image shake correction apparatus comprises:
a first table which is movable in said first direction relative to a camera body of said camera; and
a second table which supports said image sensor and is movable in said second direction on said first table,
wherein said first table is supported by a first guide bar which extends in said first direction and a first linear actuator which extends in a direction parallel with said first guide bar and moves said first table in said first direction along said first guide bar,
wherein said second table is supported by a second guide bar which extends in said second direction and a second linear actuator which extends in a direction parallel with said second guide bar and moves said second table in said second direction along said second guide bar,
wherein each of said first linear actuator and said second linear actuator comprises a rod-shaped magnet, a coil provided around said rod-shaped magnet, and a housing which covers an entire outer periphery of the coil,
wherein said rod-shaped magnet and said coil operate as a stator and a mover,
wherein said stator is connected to one of said camera body and said first table, and
wherein said mover is connected to one of said first table and said second table.

2. The image shake correction apparatus according to claim 1, wherein said rod-shaped magnet forms magnetic fields in radial directions and is composed of one of joined magnets and a multi-polar magnet,
wherein said joined magnets are composed of at least two magnets joined to each other at one of north poles and south poles thereof; and
wherein said multi-polar magnet is structured so that a plurality of magnetic poles are alternately arranged in an axial direction of said stator.

3. The image shake correction apparatus according to claim 1, further comprising:
a vibration sensor which senses vibrations of said camera; and
an electric-current controller which controls a current passed through said coil in accordance with a detection signal output from said vibration sensor,
wherein said electric-current controller passes said current through said coil in order to compensate for said vibrations that are sensed by said vibration sensor.

4. The image shake correction apparatus according to claim 1, wherein said housing has two bearing portions at opposite ends of said housing in an axial direction thereof, respectively, said two bearing portions being in contact with an outer peripheral surface of said rod-shaped magnet.

5. The image shake correction apparatus according to claim 1, wherein said coil comprises two bearing portions at opposite ends of said coil in an axial direction thereof, respectively, said two bearing portions being in contact with an outer peripheral surface of said rod-shaped magnet.

6. The image shake correction apparatus according to claim 1, wherein said rod-shaped magnet is formed from a plurality of magnets joined to each other in an axial direction of said rod-shaped magnet.

7. The image shake correction apparatus according to claim 1, wherein said rod-shaped magnet is made of an isotropic magnetic material which is magnetized to form N-poles and S-poles arranged alternately in an axial direction of said rod-shaped magnet.

8. The image shake correction apparatus according to claim 1, wherein said first table comprises an X-table which is driven to move in a horizontal direction of said camera, and
wherein said second table comprises a Y-table which is driven to move in a vertical direction of said camera relative to said X-table.

9. The image shake correction apparatus according to claim 8,
wherein said stator and said mover are fixed to and supported by said camera body and said X-table, respectively, in said first linear actuator, and
wherein said stator and said mover are fixed to and supported by said X-table and said Y-table, respectively, in said second linear actuator.

10. The image shake correction apparatus according to claim 1, wherein said coil includes at least one bearing portion which is in contact with an outer periphery of said rod-shaped magnet to be slidable thereon in an axial direction of said stator.

11. A camera having an image shake correction apparatus, comprising:
an image sensor on which an object image is formed via a photographing lens, said image sensor being driven to move in two orthogonal directions in a plane orthogonal to an optical axis of said photographing lens in such a manner as to compensate for camera shake which occurs at a time of exposure;
a first table movable in one of said two orthogonal directions relative to said camera; and
a second table mounted on said first table to be movable in the other of said two orthogonal directions relative to said first table, said image sensor being mounted on said second table,
wherein said first table is guided in a moving direction thereof by a first guide bar and a first linear actuator which are positioned at opposite ends of said first table, said first linear actuator driving said first table so as to move along said first guide bar,
wherein said second table is guided in a moving direction thereof by a second guide bar and a second linear actuator which are positioned at opposite ends of said second table, said second linear actuator driving said second table so as to move along said second guide bar,
wherein each of said first linear actuator and said second linear actuator comprises a rod-shaped magnet, a coil provided around said rod-shaped magnet, and a housing which covers an entire outer periphery of the coil,
wherein said rod-shaped magnet and said coil operate as a stator and a mover,
wherein said stator is connected to one of said camera body and said first table, and
wherein said mover is connected to one of said first table and said second table.

* * * * *